INVENTORS:
GEORGE THEODORE FLOR CRESPIN
PETER PEPERZAK
BY: Oswald H. Milmore
THEIR ATTORNEY INVENTORS:
GEORGE THEODORE FLOR CRESPIN
PETER PEPERZAK
BY: *Oswald H. Milmore*
THEIR ATTORNEY

United States Patent Office 2,965,522
Patented Dec. 20, 1960

2,965,522

WASHING SUBDIVIDED SOLIDS

George Theodore Flor Crespin, Ellesmere Port, and Peter Peperzak, Ince, England, assignors to Shell Oil Company, New York, N.Y., a corporation of Delaware Filed June 24, 1957, Ser. No. 667,542

Claims priority, application Great Britain June 25, 1956

9 Claims. (Cl. 134—25)

The invention relates to a method and apparatus for washing subdivided solid materials, such as granular or pulverulent substances. The invention is especially, although not exclusively, applicable to the regeneration of filter aids which have become fouled or coated with impurities during use, and will be described particularly as applied to this use.

The invention is directed at effecting a series of washing treatments of the solids with successive streams of washing liquid, each treatment including a centrifugal separation for the removal of washing liquid, in such a manner that the streams of washing liquid provide the energy required to achieve effective centrifugal separation and thereby discharge a thick slurry from each stage, without recourse to intermediate pumps or the like or recourse to excessively high pressures in the initial stage.

Various types of inorganic materials are commercially available for assisting in the clarification, purification and filtration of industrial liquors, notably fluids produced in various industrial chemical and oil refining processes. Thus, for example, kieselguhr, infusorial and diatomaceous earths, fullers earth, may be mentioned in this connection and a variety of kindred products are also available under diverse proprietary names such as the trademark "Clarcel." Such products may be effective by virtue of their capacity to act as adsorbents of impurities, or they may serve to facilitate the operation of a commercial filtration unit. Thus in illustration of the last-named function, it is common practice to carry out the filtration of finely dispersed solids in suspension in a liquid in an apparatus wherein the suspension is forced through a filter medium comprising a porous mass, for example a woven fabric supported on a frame of cylindrical or other configuration. With solids deposited on the filter medium, the flow of fluid becomes progressively more restricted and ultimately filtration must be curtailed while the filter cake is removed. The close packing of solid particles in the filter cake can be prevented by the continuous addition of filter adjuvants to the suspension. These products deposited on the filter medium increase the porosity of the bed of filtered solids, diminish the restriction of the flow of fluid and prolong the operating time of the filtration as well as increasing the rate of filtration.

In the following description and claims all such materials, whether functioning primarily as filtering adjuvants or as purifying adsorbents are collectively referred to hereinafter as filter aids.

In many purification operations such filter aids represent a major item of expenditure and the present invention provides an economical process for the recovery of such products in a form suitable for further use.

It is known to operate a hydrocyclone for separating solids of different specific gravities by feeding the solids from a hopper into a jet of liquid (U.S. Patent 1,197,946); however, neither washing of solids nor separation in the hydrocyclone of essentially clarified washing liquid from a thick slurry are practiced.

According to the present invention the subdivided solids bearing impurities, such as filter aid, are washed or regenerated by a continuous process wherein a slurry of the solids in a liquid is passed through a series of hydrocyclones, each operated by admitting a pressure jet of washing liquid into the corresponding hydrocyclone and entraining the slurry of solids therein to form dilute suspensions, the arrangement of the hydrocyclones and piping being such that each succeeding hydrocyclone receives the discharge of partially purified solids which are discharged as a thick slurry from the preceding hydrocyclone and the impurities are removed with the liquid the greater part of which is removed from each of the several hydrocyclones with little or no solids. In the usual case, which will be illustrated, wherein the solids have a density greater than that of the liquid, the slurries are discharged from the hydrocyclones as the underflows and the liquid streams are discharged as the overflows; however, the reverse is true when the solids have lower densities than the liquid.

In this manner each pressure jet provides the washing liquid to be used in the corresponding stage and also supplies the energy required to produce separatory vortices in the several hydrocyclones. As a consequence it becomes possible to make a direct connection from the slurry outlet of a preceding hydrocyclone to the ejector of the succeeding hydrocyclone and it is unnecessary to employ slurry pumps between stages; this is so although the entrance pressure to each hydrocyclone is only that required to effect the necessary flows therein, usually between 50 and 100 pounds per square inch (p.s.i.), and the slurries may be discharged from the respective hydrocyclones with little or no pressure. Moreover, because sufficient washing liquid is removed from the solids in each stage to produce thick slurry discharges, it is possible to effect a high overall dilution ratio and, moreover, each slurry is sufficiently concentrated to permit direct entrainment thereby by the succeeding pressure jet, without recourse to intermediate settlers or clarifiers. This makes it practicable to contact the solids repeatedly with large quantities of liquid in an economical manner. In most cases the volume of the pressure jet exceeds that of the slurry entrained thereby; thus the size of the jet is usually such that the total flow to the cyclone is 2 to 30 times the volume of entrained slurry, but other volume ratios may be used.

A "thick slurry," as the term is used herein, is one in which the solids are sufficiently concentrated to cause hindered settling of the solids and to produce a significant rise in the viscosity of the liquid. Such slurries usually contain over 1.5% by volume of solids, e.g., 2.5 to 6% in the case of slurries of water and filter aid, or even higher depending upon the relative densities of the solids and liquid and upon the characteristics of the solids. Mixtures containing less solids are dilute suspensions.

Different liquids can be employed in the successive stages. As applied, for example, to the regeneration of filter aids, water can be used in all stages and the slurry of filter aid is entrained by the pressure jet of wash water before the latter enters the hydrocyclone. This is accomplished by providing each hydrocyclone inlet with an ejector wherein the jet of pressurized liquid before it enters the cyclone impacts on, entrains and mixes with the feed of slurry of filter aid to be purified. Little or none of the kinetic energy of the pressure jet or of the incoming slurry is thus lost and on the contrary substantially all this energy is available for cyclone operation. The liquid used to form the slurry may be a solvent for the impurities present in the filter aid.

The same liquid is used to form the slurry of filter aid and to operate the hydrocyclones and a preferred liquid is water. The invention will now be more particularly described by reference to conditions which involve the use of water.

In the operation of the process of the invention water jets at pressures up to 100 p.s.i. or higher may be used. Pressures in the order of 50–60 p.s.i. have been found very suitable. The ratio of entrained slurry to total fluid flow in a hydrocyclone can be varied considerably, but ratios between 1:20 and 2:5 have proved very practical when four or more hydrocyclones are used in series. The choice will in part depend on the dimensions of the first stage ejector which must obviously be capable of handling the total amount of slurry available for treatment. In the first stage mixing ratios of about 1:5 to 1:10 are preferred. The total feed to each cyclone is a dilute suspension containing usually less than 1.5% by volume of solids.

The invention will now be described in more detail by reference to the accompanying drawings forming a part of this specification and showing one specific embodiment by way of illustration, wherein.

Figure 1:
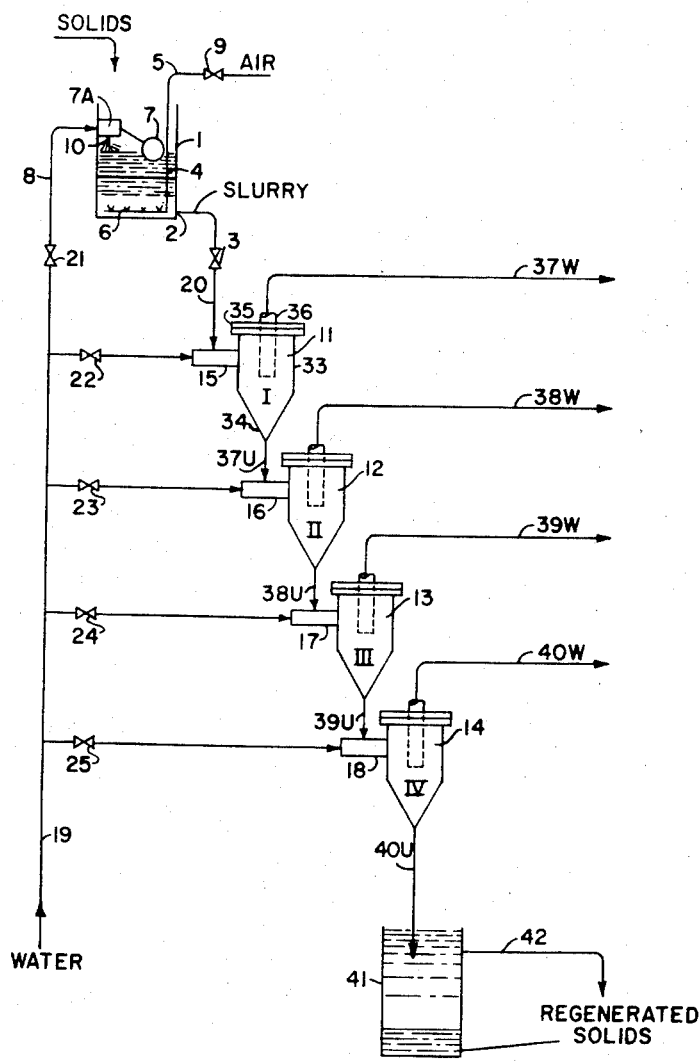
Figure 1 is a diagrammatical representation of the system employing four hydrocyclones.

Referring to Fig. 1, filter aid to be purified is introduced into an open cylindrical tank 1, which is fitted with a bottom outlet 2 and valve 3, and has a perforated brass plate 4 with regularly spaced holes fixed near the bottom of the tank to prevent large particles passing through. Agitation is provided by compressed air flowing via line 5 through a series of small holes 6 in a spiral spider tube on the bottom of the tank. A constant liquid level is maintained in the tank by a convenient ball cock 7 operating on the inlet valve 7a in the water flow line 8. Careful adjustment of the compressed air supply for agitation by the valve 9 is necessary to avoid excessive foaming but this difficulty can be overcome by feeding a fine spray of water on top of the liquid surface through a sprayer 10.

The slurry formed in the tank is treated in a series of hydrocyclones 11, 12, 13 and 14, which constitute successive stages indicated by the Roman numerals I, II, III and IV and have associated ejectors 15, 16, 17 and 18, respectively. The initial slurry is delivered via line 20 and valve 3 and is entrained by water in the ejector 15 prior to delivery into cyclone 11. Water under pressure is fed via a water supply line 19 to the flow line 8 and cylindrical tank 1 through a valve 21 and also to the several ejectors associated with the hydrocyclones via valves 22, 23, 24 and 25. The association of ejector 15 and hydrocyclone 11 in stage I, as illustrated more fully in Figures 2 and 3, finds its counterpart in the succeeding associated ejectors and hydrocyclones.

Figure 2:
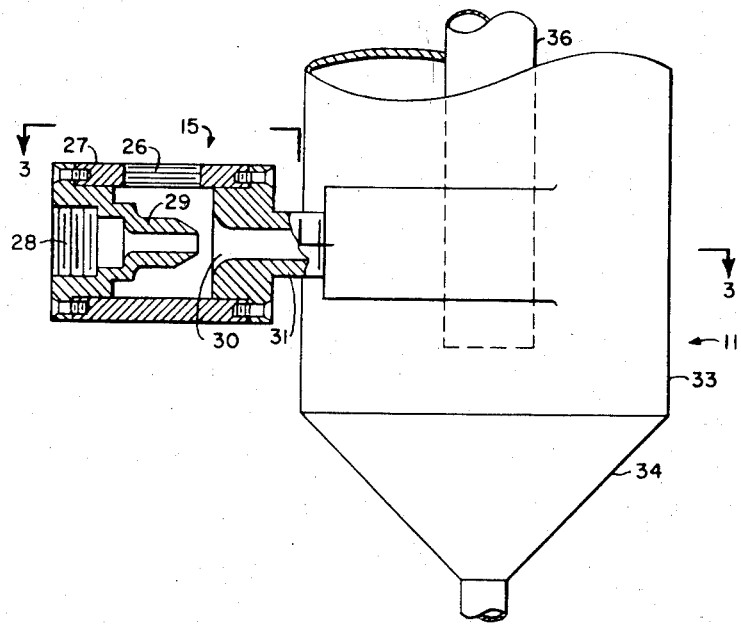
Figure 2 is a fragmentary elevation view of one hydrocyclone which is combined with an ejector.
Figure 3:
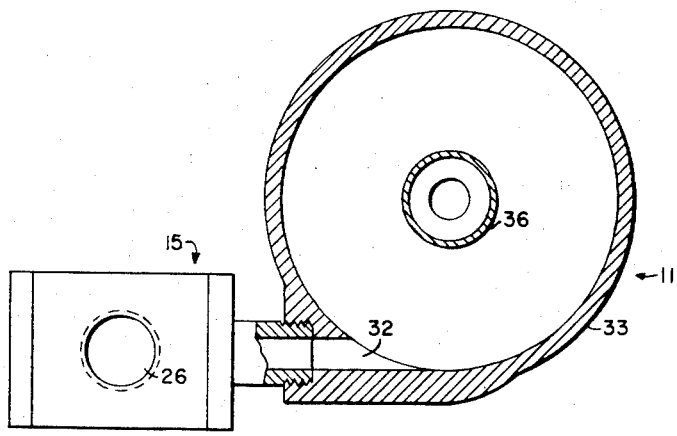
Figure 3 is a transverse sectional view taken on the line 3—3 of Figure 2.

Referring more particularly to Figures 2 and 3, the aqueous slurry delivered via line 20 enters at an inlet opening 26 in the sidewall 27 of the ejector while a supply of high-pressure water from line 19 enters via an inlet opening 28 in an ejector nozzle 29, which is directed into the throat 30 of the mixing tube 31. The water entering the throat becomes intimately mixed with slurry entering via the inlet 26 and the resulting mixture is delivered with high kinetic energy tangentially into the hydrocyclone 11 through the tangential inlet opening 32. Each hydrocyclone includes an upper cylindrical wall 33 fitted to a frusto-conical lower wall 34, a top closure plate 35, and a coaxial overflow outlet tube 36 extending through the plate. All fluid supply lines being controlled by valves, the flow is regulated, for example, to provide an inlet pressure into the first hydrocyclone of between 50 and 60 p.s.i. and a volumetric ratio of entrained slurry to total flow of 1:5 to 1:10. The cyclone itself is of relatively small dimensions and is provided with an overflow line 37w, connected to the tube 36, and an underflow line 37u which is connected to an opening at the bottom of the frusto-conical wall 34. A partial separation of impurities associated with the filter aid in the slurry is effected in cyclone 11 and such separated impurities pass mainly out by way of the overflow 37w, whereas partially purified filter aid passes as a thick slurry, containing over 2.5% by volume of solids by way of the underflow 37u into ejector 16 for a further entrainment by fresh water and purification (Stage II). Here further impurities are removed with water through the overflow line 38w and the further purified filter aid again passes out by way of the underflow, in this case line 38u; this process is repeated in a further two stages III and IV from which the slurry is discharged through the underflow lines 39u and 40u and where the pressure of incoming water to the hydrocyclone, the mixing ratio of entrained fluid to total fluid flow and the dimensions of the cyclone are also so chosen as to provide for removal of impurities by way of the respective overflows 39w and 40w. The slurry of purified filter aid is finally collected in a settling tank 41 provided with overflow line 42 and from this tank the purified and sedimented filter aid can be recovered for further use.

The process of the invention will now be described and illustrated by reference to the following example:

The apparatus employed was that described above by reference to the accompanying drawings, the respective hydrocyclones having the dimensions set out in the following Table I:

*Table 1*

| Dimensions (millimetres) | Stage No. | | | |
| --- | --- | --- | --- | --- |
| | I | II | III | IV |
| Internal Diameter | 75 | 75 | 40 | 40 |
| Length of cylindrical part of cyclone | 110 | 135 | 50 | 20 |
| Length of frusto-conical part of cyclone | 190 | 200 | 100 | 100 |
| Diameter of overflow | 14 | 11 | 10 | 9 |
| Diameter of ejector throat | 6 | 6 | 6 | 6 |
| Diameter of underflow | 8 | 6 | 6 | 6 |
| Overflow outlet tube below top of cylinder | 35 | 50 | 35 | 15 |
| Ejector throat below top of cylinder | 15 | 30 | 15 | 10 |

The filter air treated was a material sold under the trademark "Clarcel," composed of diatomaceous earth and having a specific gravity of about 2.3 which had been incorporated in the filter cake of a Dorr-Oliver Rotary Precoat Filter and used in the recovery of black sulfuric acid from various chemical operations including the sulphation of olefinic gas streams in the production of lower secondary aliphatic alcohols containing from 3–4 carbon atoms. The initial slurry contained approximately 22 lbs. of the filter aid per hour and water sufficient to produce 0.92 gallon of slurry per minute, i.e., it was a thick slurry containing 11% by volume of solids or 4% on a weight basis. The flows, mixing ratios, etc., are set forth in the following Table 2.

*Table 2*

| Stage No. | I | II | III | IV |
| --- | --- | --- | --- | --- |
| Ejector feed pressure (p.s.i.g.) | 50 | 60 | 60 | 60 |
| Driving water feed (g.p.m.) | 4.44 | 3.15 | 2.69 | 2.85 |
| Slurry feed (g.p.m.) | 0.92 | 0.16 | 0.25 | 0.16 |
| Mixing Ratio ($m$) [1] | 0.172 | 0.048 | 0.085 | 0.053 |
| Overflow (g.p.m.) | 5.2 | 3.06 | 2.78 | 2.65 |
| Underflow (g.p.m.) | 0.16 | 0.25 | 0.16 | 0.36 |

[1] The ratio $m$ is the ratio of the slurry feed to the total stream entering the hydrocyclone.
Overall mixing ratio $m_\mathrm{I} \times m_\mathrm{II} \times m_\mathrm{III} \times m_\mathrm{IV} = 0.000037$ corresponding to a dilution of approximately 27,000-fold.

The final product passing to the settling tank consisted of a slurry containing about 5% by weight of the filter aid. Approximately 75% of the filter aid fed into Stage I was recovered. Losses in filter aid occurred mainly in Stages I and II. The recovered filter aid was white in color and had a soluble carbon content comparable with that of unused product. Its bulk density and porosity were somewhat higher than that of the fresh filter aid but these modified characteristics however were without disadvantageous effect on the performance of the recovered product as a filtering adjuvant for more black spent acid liquor.

We claim as our invention:

1. A continuous process for washing subdivided solid material bearing impurities which comprises flowing a separate jet of washing liquid tangentially and under pressure into each of a series of hydrocyclones, flowing said solid material as a slurry successively through said hydrocyclones, separating out said suspension by centrifugal action in the corresponding hydrocyclone into a thick slurry and a predominantly solids-free liquid containing impurities, and separately discharging said slurry and liquid from each hydrocyclone, each slurry discharged from a preceding hydrocyclone in the series being supplied to the succeeding hydrocyclone.

2. A continuous process for washing subdivided solid material bearing impurities which comprises flowing a separate jet of washing liquid tangentially and under pressure into each of a series of hydrocyclones, flowing said solid material as a slurry successively through said hydrocyclones by entraining it successively in said jets to form in each said jet a dilute suspension, separating out said suspension by centrifugal action in the corresponding hydrocyclone into a thick slurry and a predominantly solids-free liquid containing impurities, and separately discharging said slurry and liquid from each hydrocyclone, each slurry discharged from a preceding hydrocyclone in the series being entrained in the pressure jet which enters the succeeding hydrocyclone.

3. Process according to claim 2 wherein the ratio of the slurry entrained by a pressure jet to the total fluid flow into a hydrocyclone lies between 1:2 and 1:30.

4. Process according to claim 2 wherein the liquid jets operate at pressures between about 50 and 100 p.s.i.

5. Process according to claim 2 wherein said solid material has a density greater than that of the liquid and said thick slurries contain over 1.5% by volume of solids and are discharged from the hydrocyclones as underflows.

6. A continuous process for regenerating spent filter aid which comprises flowing a separate jet of washing liquid with a density less than that of the filter aid tangentially and under pressure into each of a series of hydrocyclones, flowing said filter material as a slurry successively through said hydrocyclones by entraining it successively in said jets in amounts to form in each said jet a dilute suspension containing less than about 1.5% by volume of filter aid, separating each said suspension by centrifugal action in the corresponding hydrocyclone into an underflow consisting of a thick slurry containing more than about 2.5% by volume of filter aid and an overflow consisting predominantly of solids-free liquid containing impurities, and separately discharging said underflow and overflow from each hydrocyclone, each underflow from a preceding hydrocyclone in the series being supplied to the pressure jet of the succeeding hydrocyclone for entrainment thereby.

7. Process according to claim 6 wherein said liquid is water.

8. Apparatus for washing subdivided solid material successively with liquid jets comprising: a series of hydrocyclones, each including a tangential inlet, an overflow outlet and an underflow outlet; an ejector for each hydrocyclone having the discharge thereof connected to discharge to the inlet of the corresponding hydrocyclone and including pressure and suction inlets; means for admitting washing liquid under pressure to the pressure inlet of each of said ejectors to form a pressure jet therein; means for supplying said solid material to the suction inlet of the ejector connected to the first hydrocyclone in the series for entrainment by the pressure jet in said ejector; and conduit means interconnecting corresponding outlets from hydrocyclones other than the last in the series directly to the suction inlets of the respectively succeeding ejectors for entrainment by the pressure jets in the respective ejectors.

9. Apparatus according to claim 8 wherein said corresponding outlets are the underflow outlets.

References Cited in the file of this patent

UNITED STATES PATENTS

| | | |
|---|---|---|
| 654,647 | Koppelmann | July 31, 1900 |
| 1,197,946 | Pardee | Sept. 12, 1916 |
| 1,328,360 | Beede | Jan. 20, 1920 |
| 1,934,410 | Cummins | Nov. 7, 1933 |
| 2,098,608 | Berges | Nov. 9, 1937 |
| 2,245,195 | Hopkins | June 10, 1941 |
| 2,364,799 | Laughlin et al. | Dec. 12, 1944 |
| 2,537,904 | McAllister | Jan. 9, 1951 |
| 2,816,658 | Braun et al. | Dec. 17, 1957 |